Patented Sept. 19, 1933

1,927,136

UNITED STATES PATENT OFFICE 1,927,136

PRODUCTION OF CRESOL ETHERS ALKYLATED IN THE NUCLEUS

Karl Schöllkopf, Dusseldorf-Oberkassel, Germany, assignor to Rheinische Kampfer-Fabrik G. m. b. H., Dusseldorf-Oberkassel, Germany No Drawing. Application October 24, 1931, Serial No. 570,984, and in Germany November 10, 1930

3 Claims (Cl. 260—150)

My invention refers to means for producing cresol ethers alkylated in the nucleus.

I have found that such cresol ethers are obtained by causing condensation of cresol ethers and alcohols with more than two carbon atoms with the aid of dilute sulfuric acid.

In practising this method I prefer vigorously stirring the mixture of cresol ether and the alcohol with a 50–80% sulfuric acid during several hours at a temperature of 20–120° C.

The higher the concentration of the sulfuric acid, the lower should be the reaction temperature and vice versa. Preferably the concentration of the sulfuric acid and the temperature are so chosen that no substantial sulfonation of the cresol ether occurs, but this sulfonation does not prevent the alkylation, as the sulfo group can readily be split off again by hydrolysis.

As compared with the known method of alkylating cresol ethers with the aid of alkyl halides and aluminium chloride, alkylation with the aid of the alcohols mentioned above in the presence of dilute sulfuric acid offers considerable advantages.

In practising my invention I may for instance proceed as follows:

Example 1.—A mixture of 732 grams meta-cresol methyl ether and 444 grams isobutyl alcohol is vigorously stirred during fifteen hours at 90° C. with 7 kgs. of a 61% sulfuric acid. After cooling the supernatant reaction product is separated from the sulfuric acid and is subjected to fractional distillation, which results in unchanged meta-cresol methyl ether (boiling at 177° C.) and tertiary butyl meta-cresol methyl ether boiling at 228° C. and melting at 22° C.

The isobutyl alcohol may as well be replaced by tertiary butyl alcohol.

Example 2.—A mixture of 732 grams meta-cresol methyl ether and 444 grams isobutyl alcohol is vigorously stirred at 55° C. during 20 hours with 7 kgs. of a 70% sulfuric acid. The tertiary butyl meta-cresol methyl ether can be recovered from the reaction mixture as described with reference to Example 1.

Example 3.—A mixture of 732 grams meta-cresol methyl ether and 360 grams isopropyl alcohol is vigorously stirred during fifteen hours at 90° C. with 7 kgs. of a 58% sulfuric acid and treated further as described with reference to Example 1. Besides unchanged meta-cresol methyl ether is obtained the thymolmethyl ether.

In the production of this ether the isopropyl alcohol can also be replaced by propyl alcohol, but in this case a temperature of 110° C. should be maintained.

Various changes may be made in the details disclosed in the foregoing specification without departing from the invention or sacrificing the advantages thereof.

I claim:—

1. The method of producing cresol alkyl ethers alkylated in the nucleus, comprising acting with an alcohol having more than two carbon atoms on a cresol alkyl ether at a temperature of 20–120° C. in the presence of sulfuric acid of 50–80%.

2. The method of producing cresol methyl ethers alkylated in the nucleus, comprising acting with an alcohol having more than two carbon atoms on cresol methyl ether at a temperature of 20–120° C. in the presence of sulfuric acid of 50–80%.

3. The method of producing thymol methyl ether, comprising acting with isopropyl alcohol on meta-cresol methyl ether at a temperature of 20–120° C. in the presence of sulfuric acid of 50–80%.

KARL SCHÖLLKOPF.